United States Patent [19]

Inoue et al.

[11] Patent Number: 4,706,546
[45] Date of Patent: Nov. 17, 1987

[54] BOOSTER RATIO CONTROLLER FOR LIQUID PRESSURE BOOSTER

[75] Inventors: Hidefumi Inoue, Ohmiya; Yuzoh Gotoh, Higashimatsuyama; Kimio Ishihara, Kawagoe, all of Japan

[73] Assignee: Jidosha Kiki Co., Ltd., Tokyo, Japan

[21] Appl. No.: 760,807

[22] Filed: Jul. 30, 1985

[30] Foreign Application Priority Data

Aug. 8, 1984 [JP] Japan .................... 59-166274
Aug. 18, 1984 [JP] Japan .................... 59-172105

[51] Int. Cl.$^4$ .................... F15B 9/09; B60T 13/20
[52] U.S. Cl. .................... 91/370; 91/416; 60/553; 180/141
[58] Field of Search .............. 60/547.1, 548, 552, 60/553, 550, 545; 91/416, 370; 180/141

[56] References Cited

U.S. PATENT DOCUMENTS

| | | | |
|---|---|---|---|
| 3,564,849 | 2/1971 | Hurata et al. | 60/533 X |
| 3,724,332 | 2/1972 | Bach | 91/391 R |
| 3,747,473 | 3/1971 | Bach et al. | 91/417 R X |
| 4,196,592 | 4/1980 | Nomura et al. | 60/547.1 |
| 4,216,841 | 8/1980 | Ohtuka et al. | 180/141 |
| 4,223,533 | 2/1979 | Valentin | 60/548 X |
| 4,254,623 | 8/1978 | Dauvergne | 60/548 |
| 4,341,076 | 7/1982 | Steffes | 60/547.1 |
| 4,514,981 | 5/1985 | Brown et al. | 60/547.1 |
| 4,566,718 | 1/1986 | Kanai et al. | 180/141 X |

FOREIGN PATENT DOCUMENTS

| | | |
|---|---|---|
| 1277046 | 9/1968 | Fed. Rep. of Germany . |
| 2421329 | 11/1974 | Fed. Rep. of Germany ..... 60/547.1 |
| 2945632 | 5/1981 | Fed. Rep. of Germany . |
| 1345951 | 2/1974 | United Kingdom .............. 60/547.1 |

Primary Examiner—Robert E. Garrett
Assistant Examiner—George Kapsalas
Attorney, Agent, or Firm—Flynn, Thiel, Boutell & Tanis

[57] ABSTRACT

A liquid pressure booster as may be used in a brake booster or clutch booster produces an oil pressure of a level which corresponds to the magnitude of an input applied to an input shaft. The oil pressure acts upon a power piston, which then produces an amplified output in response to a small input. The oil pressure is also returned to act upon the input shaft so as to provide a reaction to the input. The invention provides a step in at least one of the input shaft and the power piston so that the combination of the step and the housing defines a pressure chamber having a pressure responsive surface at the step. A flow path switching valve selectively establishes a communication of the pressure chamber with either the power chamber or a reservoir. When the switching valve is operated, the pressure responsive area of the input shaft which is acted upon by the oil pressure can be changed, thereby changing the magnitude of the reaction transmitted to a driver. The pressure responsive area of the power piston which is acted upon by the oil pressure may be changed, thereby changing the magnitude of an output. The booster ratio of liquid pressure booster may be changed according to the preference of a driver or the conditions under which the braking action is applied.

7 Claims, 4 Drawing Figures

BOOSTER RATIO CONTROLLER FOR LIQUID PRESSURE BOOSTER

FIELD OF THE INVENTION

The invention relates to a liquid pressure booster which may be used in a brake booster or a clutch booster, and more particularly, to a booster ratio controller for liquid pressure booster which permits the booster ratio to be changed.

DESCRIPTION OF THE PRIOR ART

A liquid pressure booster usually comprises a power piston which is slidably fitted in a housing, and a control valve which is mechanically coupled to an input shaft for introducing an oil pressure into a power chamber, formed at one end of the power piston, to drive the power piston forward in accordance with an input applied to the input shaft, a booster action being achieved by the oil pressure which is introduced into the power chamber in response to an input acting to develop an output of an increased magnitude. the oil pressure introduced into the power chamber is fed back upon the input shaft to provide a reaction.

A liquid pressure booster of the kind described is well known in the art. Conventional liquid pressure boosters have a fixed, constant booster ratio. Accordingly, when such liquid pressure booster is used as a brake booster of a truck, a driver will experience difference braking reactions between an unloaded and a loaded condition. The braking effort is often sensed as of an insufficient magnitude when the vehicle is loaded. In addition, for an equal braking condition, one driver may sense it at a level which is higher than the level sensed by another driver, because of a variation in the preference of braking reactions from driver to driver.

SUMMARY OF THE INVENTION

In view of the foregoing, it is an object of the invention to provide a booster ratio controller for liquid pressure booster which permits a booster ratio of the booster to be changed in accordance with the preference of a driver and the condition under which the braking action is applied.

The above object is achieved in accordance with the invention by forming a step on at least one of the input shaft and the power piston to define a pressure chamber comprising the step and the housing and in which the step represents a pressure responsive surface, and by providing a flow path switching valve which selectively communicates the pressure chamber with the power chamber or a reservoir.

With this arrangement, the reaction transmitted to the driver can be changed by changing the area of a surface which is responsive to an pressure acting upon the input shaft. Alternatively, or in addition, the magnitude of the output can be changed by changing the area of a surface responsive to an oil pressure which acts on the power piston. In this manner, the booster ratio of the liquid pressure booster can be suitably changed depending on the preference and the condition under which the braking action is applied.

Above and other objects, features and advantages of the invention will become apparent from the following description of several embodiments thereof with reference to the drawings.

DETAILED DESCRIPTION OF EMBODIMENTS

Figure 1:
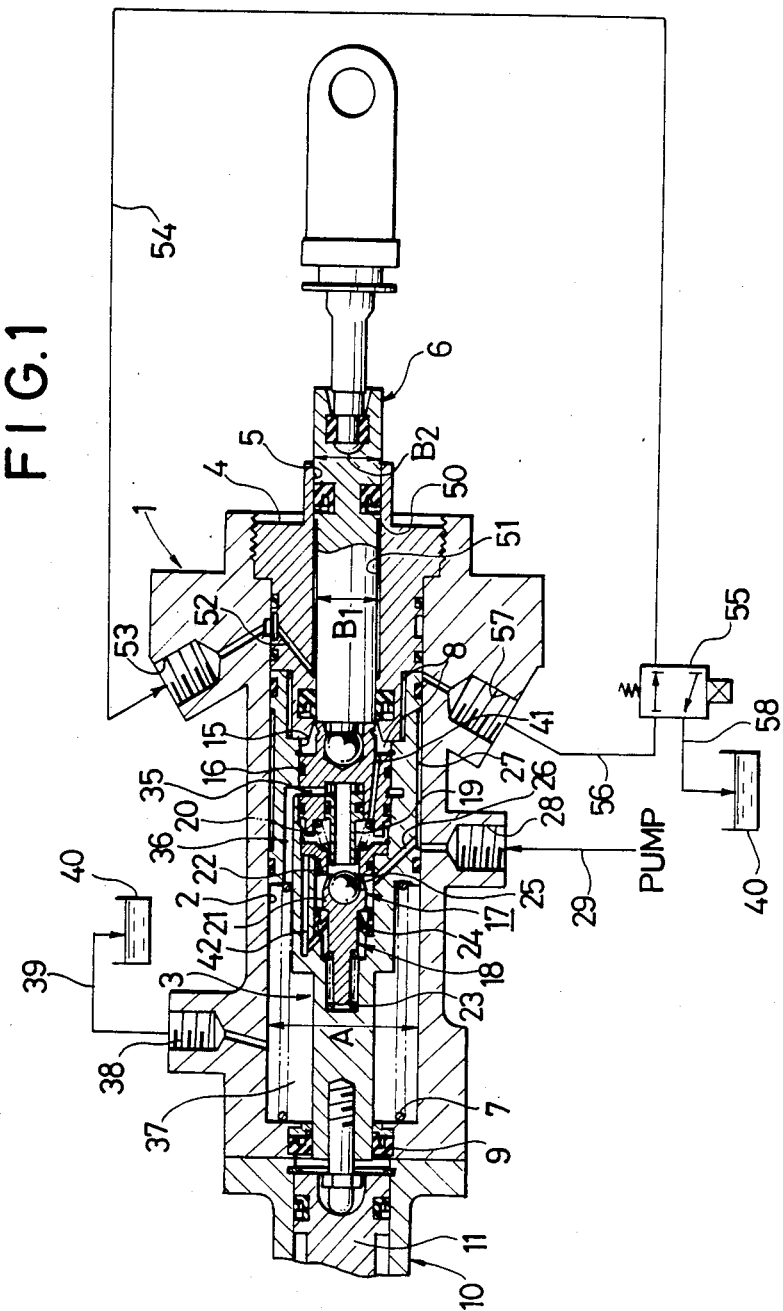
FIG. 1 is a longitudinal section of one embodiment of the invention.

Several embodiments of the invention as applied to a brake booster will now be described. Referring to FIG. 1, there is shown a liquid pressure booster including a housing 1 which is substantially cylindrical in configuration. The housing has a shank portion in which a bore 2 is defined, slidably receiving a power piston 3. A plug 4 is threadably engaged with the housing 1 to close the right-hand end of the bore 2, and is formed with an opening 5 which is coaxial with the bore 2 for slidably receiving an input shaft 6 which is mechanically coupled to a brake pedal, not shown. It is to be understood that the plug 4 forms part of the housing 1.

The power piston 3 is normally maintained in abutment against the plug 4 by a spring 7 which is received within the bore 2, thus defining a power chamber 8 between the right end of the power piston 3 and the plug 4. The power piston 3 has a left end of a reduced diameter, which extends through a sealing member 9 disposed within the housing 1 for connection with a piston 11 associated with a master cylinder 10.

The inner end of the input shaft 6 is slidably fitted into a bottom-closed opening 15 formed in the right-hand shank portion of the power piston 3, with a sealing member 16 maintaining a liquid tightness. A control valve 17 is disposed on the end portion of the input shaft 6 and in the opening 15 in the power piston 3 for introducing an oil pressure into the power chamber 8 which depends on the magnitude of an input applied to the input shaft 6. The control valve 17 includes a check valve 18 disposed in the opening 15 and an annular pin 19 mounted in the input shaft 6 and acting to open the check valve 18 forcibly, with a spring 20 disposed therebetween to maintain them apart so that the check valve 18 is normally closed by maintaining the input shaft 6 in abutment against a stop ring on the power piston 3.

The check valve 18 includes a valve element 21 which is adapted to be seated upon a valve seat 22 formed on the power piston 3 from left, as viewed in FIG. 1, under the resilience of a spring 23. A pressure chamber 25 is defined by a seal formed between the valve element 21 and the valve seat 22 on one hand and a sealing member 24 on the other hand which is effective to seal the valve element 21, and communicates through a passage 26 formed to extend through the power piston 3, an annular groove 27 formed around the outer peripheral surface of the power piston 3, a passage 28 extending through the housing 1 and a conduit 29 connected thereto with a pump, not shown, whereby a pressure oil is normally introduced into the pressure chamber 25.

The annular pin 19 has a shank portion which communicates through a passage 35 formed in the input shaft 6 and a passage 36 formed in the power piston 3 with an oil chamber 37 defined in the bore 2 within the housing 1, and further communicates through a passage 38 formed in the housing 1 and a conduit 39 connected thereto to a reservoir 40 of the pump, not shown. A gap, between the outer peripheral surface of the annular pin 19 and the internal peripheral surface of a member secure to the power piston 3 and on which the annular pin 19 is loosely fitted and defining the valve seat 22, communicates through a passage 41 formed in the input shfat 6 with the power chamber 8. A portion of the valve element 21 of the check valve 18 which is located to the left of the sealing member 24 communicates through an axial passage 42 formed in the power piston 3 with the peripheral portion of the annular pin 19.

In the present embodiment, the input shaft 6 is formed with a step 50, and has an increased diameter in its region which is located nearer the brake pedal, not shown, than the step 50. The combination of the step 50 and the plug 4 defines a reaction chamber 51. The reaction chamber 51 communicates through a passage 52 formed in the plug 4, a passage 53 formed in the housing 1, a conduit 54 with a solenoid-operated flow path switching valve 55 which is disposed in the conduit 54. The valve 55 then communicates through a conduit 56 and a passage 57 formed in the housing 1 with the power chamber 8. It also communicates with the reservoir 40 through a conduit 58.

The switching valve 55 is adapted to be operated automatically in response to a detector which senses the loading condition of a vehicle, not shown, or in response to a manual switch so as to change its flow path, whereby the reaction chamber 51 can be brought into communication with either one of the power chamber 8 or the reservoir 40.

In the non-operative condition shown, the power chamber 8 communicates with the shank portion of the annular pin 19 through the passage 41 in the input shaft 6 and through the peripheral portion of the annular pin 19 with the shank portion of the annular pin 19, which in turn communicates with the reservoir 40 as mentioned above. Accordingly, the oil pressure within the power chamber 8 is maintained substantially at zero. Under a loaded condition of the vehicle, the valve 55 normally maintains the reaction chamber 51 in communication with the reservoir 40, thus preventing the oil pressure from being introduced into the reaction chamber 51.

If the brake pedal, not shown, is now depressed under the non-operative condition shown to move the input shaft 6 to the left, the inner end of the annular pin 19 abuts against the valve element 21 of the check valve 18, which is then sealed, thus interrupting the communication between the power chamber 8 and the reservoir 40. As the input shaft 6 continues to move to the left, the annular pin 19 causes the valve element 21 to be moved away from the valve seat 22, whereby the pressure oil which is normally introduced into the pressure chamber 25 is admitted into the power chamber 8 through the peripheral portion of the annular pin 19 and the passage 41. The pressure oil is then also fed into the left-hand side of the valve element 21 through the axial passage 42 formed in the power piston 3, thus preventing the valve element 21 being driven to the left in response to the pressure oil which is introduced into the power chamber 8.

Figure 2:
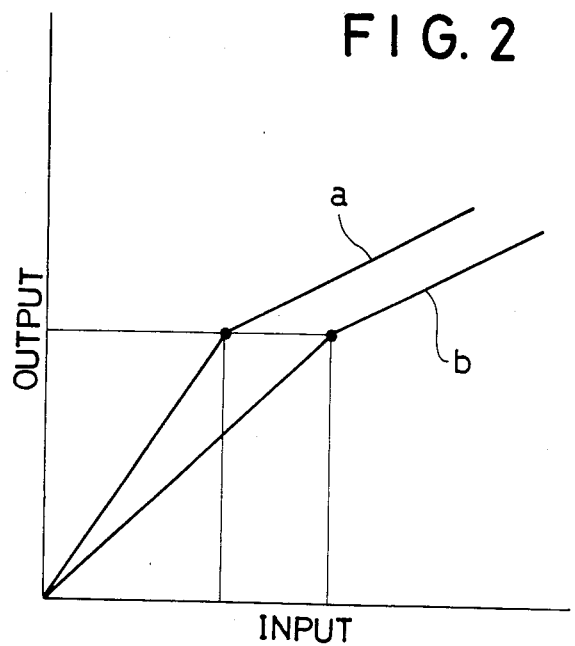
FIG. 2 graphically illustrates the characteristic obtained with the invention shown in FIG. 1.

When the pressure oil is introduced into the power chamber 8, the pressure oil acts upon a pressure responsive area A of the power piston 3, driving the power piston 3 to the left against there silience of the spring 7. The pressure oil also acts upon a reduced cross-sectional area B1 of the input shaft, allowing a driver to sense a reaction to the operation of the brake. At an intermediate loaded condition, the magnitude of the oil pressure introduced into the power chamber 8 is controlled by the magnitude of an input applied to the input shaft, or to a pressure level which depends on the depression of the brake pedal, in the similar manner as occurs in a braking liquid pressure booster of this kind used in the prior art. Accordingly, a constant booster ratio is obtained as indicated by a linear curve a graphically shown in FIG. 2. The booster ratio is given by A/B1.

When the brake is released, the valve element 21 becomes seated upon the valve seat 22 to cease the supply of the pressure oil to the power chamber 8, which is then rendered in communication with the reservoir 40 through the shank portion of the annular pin 19, thus reducing the pressure within the power chamber 8 to return to the non-operative condition shown.

When the vehicle becomes unloaded, the switching valve 55 brings the reaction chamber 51 into communication with the power chamber 8, whereby the oil pressure of the same magnitude as that introduced into the power chamber 8 is introduced into the reaction chamber 51. In this instance, the force of reaction applied to the input shaft 6 also acts upon an increased cross-sectional area B2 thereof, whereby the booster ratio will be given by A/B2 (B2>B1). Thus it is apparent that the booster ratio will be reduced (see a linear curve b shown in FIG. 2) as compared with the booster ratio obtained when the vehicle is loaded.

In the described embodiment, the input shaft 6 has an increased diameter toward the brake pedal, but conversely it may have a reduced diameter toward the brake pedal. In such instance, an increased booster ratio will be obtained when the reaction chamber 51 communicates with the power chamber 8 while a reduced booster ratio will be obtained when the reaction chamber 51 communicates with the reservoir 40. The arrangement is not limited to the provision of a single step in the input shaft or the provision of a single reaction chamber 51, but that more than one steps may be provided to define a plurality of reaction chambers.

Figure 3:
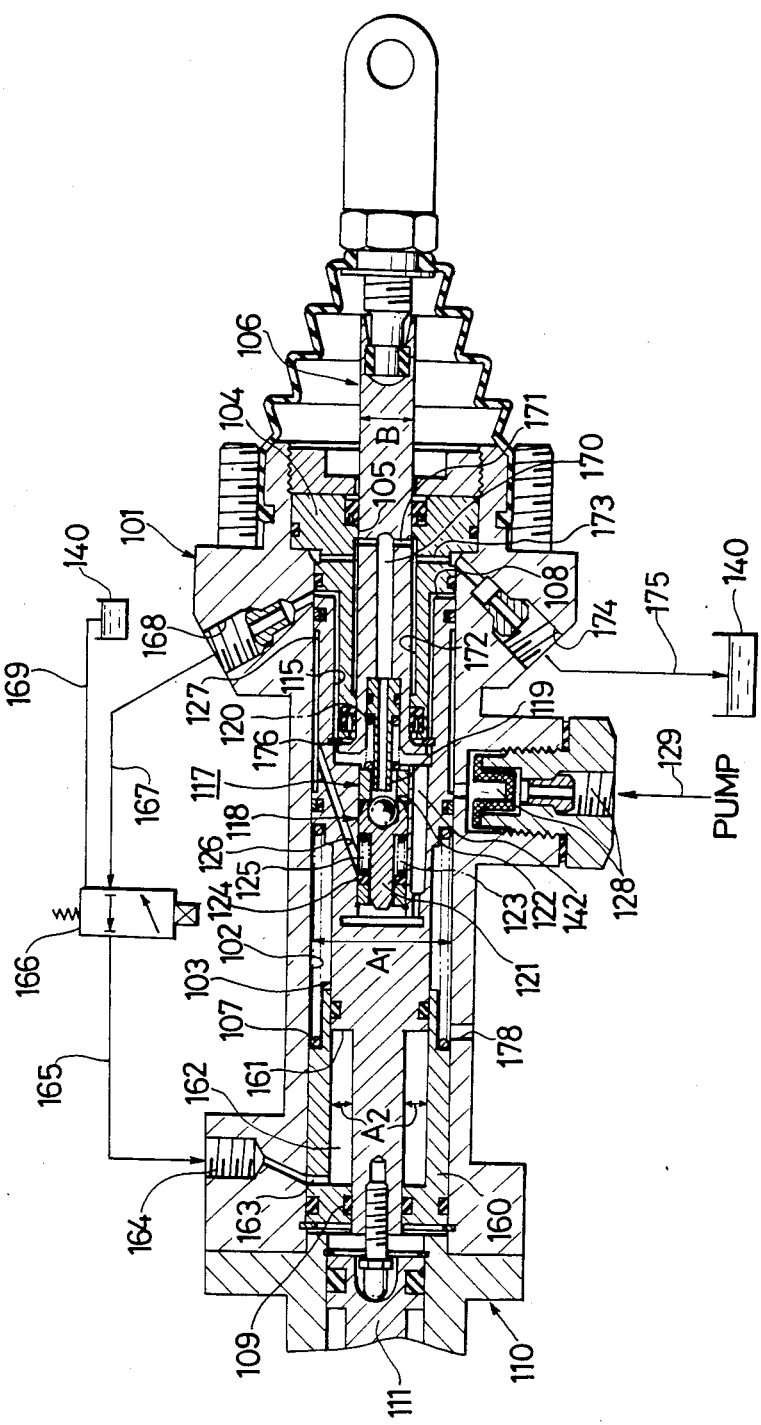
FIG. 3 is a longitudinal section of another embodiment of the invention.

FIG. 3 shows another embodiment of the invention. In the first embodiment described above, a reaction chamber 51 is defined to permit the magnitude of a reaction transmitted to the input shaft 6 to be changed. However, in the present embodiment, a step is formed in the power piston to define a second power chamber in addition to a first chamber which is equivalent to the power chamber 8 of the described embodiment, thus allowing a change in the output rather than in the reaction.

Referring to FIG. 3, a housing 101 is formed with a bore 102 in which a power piston 103 is slidably fitted. A first power chamber 108 which is equivalent to the power chamber 8 of the first embodiment is defined between the right end of the power piston 103 and a plug 104. The power piston 103 has an intermediate diameter toward its left end which is slidably fitted in a cylindrical member 160 which is fitted in the bore 102 at the right end thereof. A step 161 is formed in the power piston 103 in a region located within the cylindrical member 160, with a second power chamber 162 being defined to the left of the step 161.

The second chamber 162 communicates through a passage 163 formed in the cylindrical member 160, a passage 164 formed in the housing 101 and a conduit 165 with a solenoid-operated flow path switching valve 166 which is disposed in the conduit 165. The switching valve 166 communicates through a conduit 167 and a passage 168 formed in the housing 101 with the first power chamber 108. The switching valve 166 also communicates through a conduit 169 with a reservoir 140. In this manner, the flow path switching valve 166 is operable to switch the flow path so that the second power chamber 162 may be brought into communication with either one of the first power chamber 108 or the reservoir 140.

A control valve 117 is defined by an annular pin 119 having a shank portion, which communicates through an axial passage 170 and a radial passage 171 both formed in the input shaft 106 with an annular groove 172 formed in the plug 104, and thence, through a passage 173 formed in the plug 104, a passage 174 formed in the housing 101 and a conduit 175 connected thereto with the reservoir 140.

In FIG. 3, a stop ring 176 is formed in an opening 115 formed in the power piston 103 to limit the retracted position of the input shaft 106. A filter 177 is disposed in a passage 128. A passage 178 is effective to open a chamber, in which the spring 107 urging the power piston 103 is disposed, to the atmosphere. In other respects, the arrangement is substantially similar to that of the previous embodiment, and accordingly corresponding or similar parts are designated by like reference numerals as used in FIG. 1 to which 100 is added.

Figure 4:
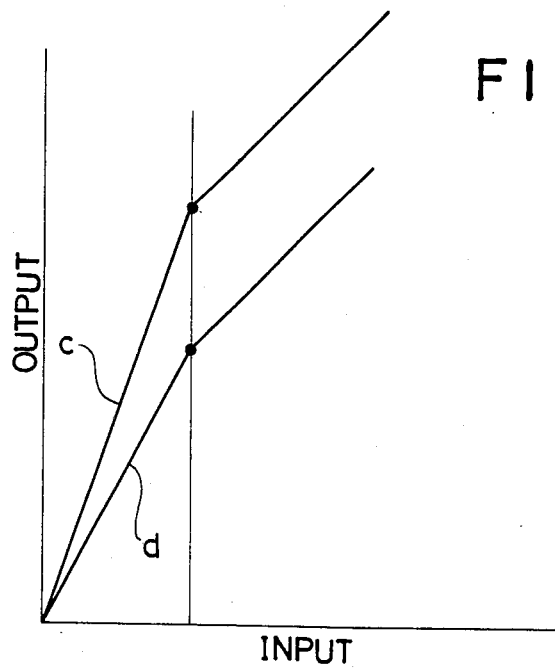
FIG. 4 graphically illustrates the characteristic obtained with the invention shown in FIG. 3.

In the present embodiment, the switching valve 166 maintains the second power chamber 162 in communication with the reservoir 140 whenever the vehicle is loaded, thus preventing the oil pressures from being introduced into the second power chamber 162. If the pressure oil is now introduced into the first power chamber 108 under this condition, the pressure oil acts upon a pressure responsive area A1 of the power piston 103, causing the power piston 103 to be driven to the left against the resilience of the spring 107. The pressure oil also acts upon a reduced cross-sectional area B of the input shaft, allowing a driver to sense a reaction to the brake. Accordingly, the booster ratio will be given by A1/B (corresponding to the curve c shown in FIG. 4).

On the other hand, when the vehicle becomes unloaded and the switching valve 166 establishes a communication between the second power chamber 162 and the first power chamber 108, the oil pressure of the same magnitude as that introduced into the first power chamber 108 is also introduced into the second power chamber 162. The pressure oil introduced into the second power chamber 162 acts upon a pressure responsive area A2 of the power piston, tending to drive the power piston 103 back. Accordingly, the booster ratio will be given by (A1–A2)/B. Thus it is apparent that the booster ratio will be reduced when the vehicle is unloaded (see the curve d shown in FIG. 4) as compared to the booster ratio obtained when the vehicle is loaded.

In the embodiment described above, the second power chamber 162 is provided by forming a portion of the power piston 103 located toward the master cylinder 110 with a reduced diameter. However, the second power chamber may also be defined by providing an increased diameter at this portion of the power piston. In such instance, the pressure oil introduced into the second power chamber drives the power piston in the same direction as does the pressure oil introduced into the first power chamber, so that an increased booster ratio will be obtained when the second power chamber communicates with the first power chamber while a reduced booster ratio will be obtained when the second power chamber communicates with the reservoir. It is to be understood that the provision of a single step in the power piston 103 or a single second power chamber 162 is not essential, but that more than one steps may be formed to provide a plurality of second power chambers.

The described embodiments represent the application of the invention to a liquid pressure booster which employs a closed circuit, but is should be understood that the invention is equally applicable to a liquid pressure booster employing an open circuit. In addition, it should be understood that the use of the invention is not limited to a brake booster, but that the invention is equally applicable to a clutch booster.

While the invention has been shown and described above in connection with the several embodiments thereof, it should be understood that a number of changes, modifications, and substitutions will readily occur to one skilled in the art without departing from the spirit and scope of the invention as defined by the appended claims.

What is claimed is:

1. A vehicular brake or clutch liquid pressure booster responsive to an input for providing an output boosted in a selected ratio with respect to the input, the booster comprising:

a power piston and an input shaft slidably fitted in a housing;

a power chamber formed at one end of the power piston;

a control valve responsive to an input to said input shaft for introducing an oil pressure into the power chamber to thereby drive the power piston forward and to act upon the input shaft to provide a reaction to the input, said oil pressure corresponding in magnitude to said input applied to said input shaft; and booster ratio controller means actuable for changing said booster ratio, said booster ratio changing means comprising a step formed in at least one of the input shaft and the power piston, said step and housing in combination defining a pressure chamber having a pressure responsive surface at the step, and a flow path switching valve actuable for alternatively connecting said pressure chamber with either said power chamber or an oil reservoir.

2. A booster ratio controller according to claim 1 in which the step is axially spaced from and opposes a wall fixed with respect to the housing.

3. Apparatus according to claim 1 in which the step is formed in the input shaft, and the pressure chamber defined by the step represents a reaction chamber, the step being oriented such that the pressure introduced into the reaction chamber urges the input shaft in a direction opposite from the direction of the forward movement thereof.

4. Apparatus according to claim 1 in which the step is formed in the power piston and the pressure chamber defined by the step forms a second power chamber.

5. Apparatus according to claim 4 in which the step is oriented such that the presure introduced into the second power chamber drives the power piston in a direction opposite from the direction of the forward movement thereof.

6. Apparatus according to claim 1 in which the switching valve comprises a solenoid-operated flow path switching valve which responds to a detector detecting the loading condition of an associated vehicle.

7. A booster ratio controller for liquid pressure booster which includes a power piston slidably fitted in a housing, a power chamber formed at one end of the power piston, and a control valve responsive to an input shaft by introducing an oil pressure into the power chamber which corresponds to an input applied to the input shaft to thereby drive the power piston forward, the oil pressure introduced into the power chamber also acting upon the input shaft to provide a reaction to the input; the booster ratio controller comprising a step formed in at least one of the input shaft and the power piston, the combination of the step and the housing defining a pressure chamber having a pressure responsive surface at the step, and a flow path switching valve for selectively establishing a communication of the pressure chamber with either the power chamber or a reservoir.

* * * * *